A. S. BIXBY.
POWER MOLDING MACHINE.
APPLICATION FILED SEPT. 4, 1914.
1,158,398.
Patented Oct. 26, 1915.
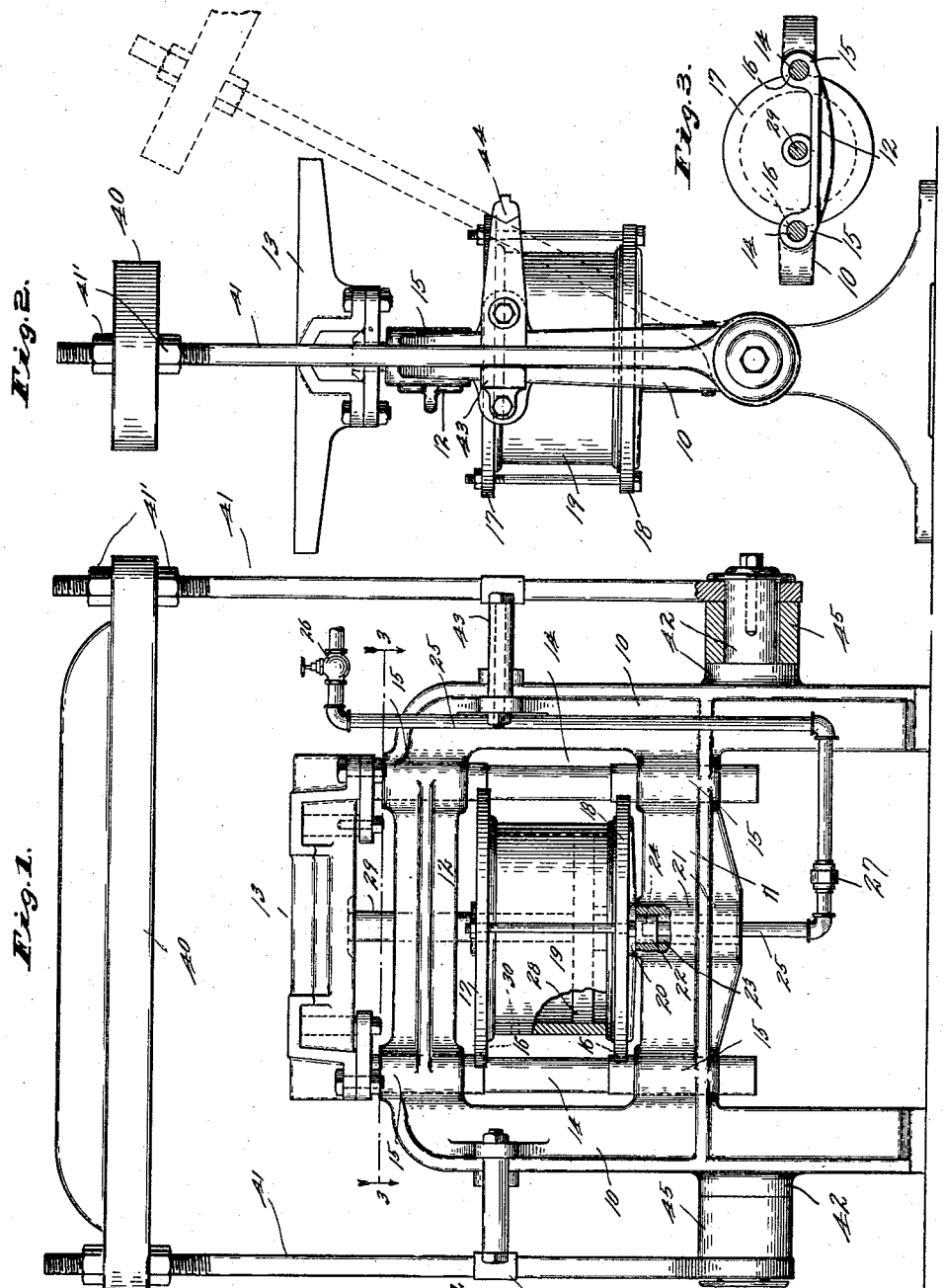
WITNESSES:
Frank A. Fahle
Josephine Gasper
INVENTOR
Allan S. Bixby,
BY
Hood & Schley
ATTORNEYS
COLUMBIA PLANOGRAPH CO., WASHINGTON, D. C.

UNITED STATES PATENT OFFICE.

ALLAN S. BIXBY, OF INDIANAPOLIS, INDIANA, ASSIGNOR TO THE B. & B. MFG. CO., OF INDIANAPOLIS, INDIANA, A CORPORATION OF INDIANA.

POWER MOLDING-MACHINE.

1,158,398.   Specification of Letters Patent.   Patented Oct. 26, 1915.

Application filed September 4, 1914. Serial No. 860,145.

*To all whom it may concern:*

Be it known that I, ALLAN S. BIXBY, a citizen of the United States, residing at Indianapolis, in the county of Marion and State of Indiana, have invented a new and useful Power Molding-Machine, of which the following is a specification.

Much labor and time may be saved in foundry work by using power instead of the ordinary hand rammers for packing the sand in the flasks; and in addition this makes a much better and more uniformly packed mold in most cases. However, different pressures are required for different kinds and sizes of work, and these are difficult to obtain with any precision with a simple fluid-pressure operated device, for compressed air is ordinarily the most convenient source of power for this work. It is also desirable at times to change the size of a molding machine to accommodate some larger piece of work than is usually taken.

It is the object of my present invention to provide a power molding machine which can easily be made to produce any desired pressure; and which can readily be changed in size. In accomplishing this object I provide a readily removable power device, such as a cylinder and piston operated by compressed air, so that it can be removed and another one of different size easily substituted, thus giving a different pressure on the work with the same air pressure; and I preferably lock such power device in place by the mold table, so that the removal of the latter makes it possible to remove the former. In addition, I mount the pivot arms of the "bail" on long pins carrying heavy washers, so that by locating the washers on the inner or outer sides of the pivot arms a different length of "bail" may be taken, thus changing the size of the machine.

The accompanying drawing illustrates my invention.

Figure 1 is a front elevation of a power molding machine embodying my invention; Fig. 2 is a side elevation thereof; Fig. 3 is a plan view on a smaller scale of such machine with the bail and mold table removed; and Fig. 4 is a sectional view showing the pneumatic connection to the bottom of the cylinder.

The main frame has two supporting uprights 10 connected by a straight lower cross bar 11 and a curved upper cross-bar 12, and a mold table 13 having two supporting slide rods 14 is mounted in this frame for vertical sliding movement, the slide rods 14 extending downward through alined guide openings 15 in and near the ends of the upper and lower cross bars. The mold table and its slide bars may be lifted vertically clear of the frame. The slide bars 14 when in place pass through notches 16 in peripheral extensions of the upper and lower heads 17 and 18 of a fluid pressure cylinder 19 located between the cross bars 11 and 12, adjacent faces of the lower cylinder head 18 and the lower cross bar 11 having central coöperating bosses 20 and 21 for supporting the cylinder 19 centrally, and the boss 20 conveniently having a central depending extension 22 which fits in a corresponding central opening 23 through the boss 21 and cross bar 11 to position the cylinder. An opening 24 extends through the extension 22, boss 20, and cylinder head 18, this opening being threaded to receive the upper end of an air pipe 25 which extends from below the cross bar 11 nearly through the opening 23 and is connected to any suitable source of fluid pressure, such as compressed air. This pipe has in it a suitable control valve 26, arranged at any desired point, and a union 27 arranged below the cross-bar 11 and between the uprights 10 so that by disconnecting such union that part of the pipe which extends through the opening 23 may be unscrewed from the opening 24 without disturbing the remainder of the pipe 25. A piston 28 is mounted in the cylinder 19 and carries an upwardly extending piston rod 29 which bears against the bottom of a depression or pocket in the under side of the mold table 13 for operating the latter. The upper cross bar 12 is so curved that it is entirely in front of the piston rod 29, as is clear from Fig. 3. The cylinder 19 has one or more openings 30 in its side walls near but not at the top, so that the piston may move freely up and down so long as it is below such openings but is cushioned by the pocketed air above it as soon as it passes above such openings. There may be any number of cylinders and pistons, of varying piston area but all of the same size between notches 16, and any one of these cylinders with its piston may be placed in the frame, as desired. The changing from one cylinder to another merely requires that the mold table be lifted off, the union 27 disconnected and the pipe 25 unscrewed from that cylinder which is in place, the raising of such cylinder to make the extension 22 clear the boss 21, and the rearward withdrawal of such cylinder, the curved upper cross-bar 12 permitting this; and the insertion of another cylinder by a reverse series of operations. Each cylinder and piston will produce a given total pressure upward on the mold table, for a given air pressure; so that any desired pressure, according to the character of the work and the air pressure available, may be obtained by the proper choice of cylinders. Cylinders can be changed easily and quickly. Ordinarily only a few sizes of cylinders are required, though any desired number may be used.

The mold table 13 coöperates with a "bail" 40 through the ends of which pass threaded rods 41 on which the bail is adjustable by nuts 41'. The lower ends of the rods 41 are pivoted on trunnions 42, which project from the uprights 10, so that the bail may be swung into operative position over the mold table 13, as shown in full lines in Fig. 2, or may be swung back, as shown in dotted lines in such figure, when in this latter position permitting the work to be placed on and removed from the mold table more easily. Stops 43 and 44 limit the forward and backward swinging of the pivot arms 41. Sometimes bails 40 of different length are required, and to this end the trunnions 42 are made long and provided with heavy washers 45. If the washers 45 are put on the trunnions first, and the pivot ends of the arms 41 then placed on such trunnions, a comparatively long bail 40 is received; while if the pivot ends of the arms 41 are first placed on the trunnions and the washers 45 are placed over them, a bail of less length is used. This permits the two sizes of machines to be made with the same frame or a single frame to be changed to receive different bails as occasion requires.

In operation, with any cylinder 19 and any bail 40 in place, the flask in which the sand is to be compressed is placed on the mold table 13, the bail 40 is swung forward to the full line position shown in Fig. 2, and the valve 26 is open to admit air beneath the piston 28, which is forced upward by the compressed air and forces the mold table 13 toward the bail 40, packing the sand in the flask between them.

I claim as my invention:

1. A power molding machine, comprising a frame, a power device removably mounted in said frame, and a mold table operated by said power device, said mold table being removable from the frame and when in place locking the power device in place in the frame.

2. A power molding machine, comprising a frame having a lower cross bar and an upper cross bar, a fluid-pressure cylinder mounted between said cross bars, a piston mounted within said cylinder, a piston rod extending from said piston above said upper cross bar, said upper cross bar being bent so that the piston rod passes on one side of it, and a mold table mounted in said frame and resting on the upper end of said piston rod, said mold table having guide rods which extend downward through suitable openings in the frame and interlock with said cylinder to hold the latter in place.

3. A power molding machine, comprising a frame having a lower cross bar and an upper cross bar, a fluid-pressure cylinder mounted between said cross bars, a piston mounted within said cylinder, a piston rod extending from said piston above said upper cross bar, and a mold table mounted in said frame and resting on the upper end of said piston rod, said mold table having guide rods which extend downward through suitable openings in the frame and interlock with said cylinder to hold the latter in place.

4. A power molding machine, comprising a frame having a lower cross bar and an upper cross bar, a fluid-pressure cylinder removably mounted between said cross bars, a piston mounted within said cylinder, a piston rod extending from said piston above said upper cross bar, said upper cross bar being bent so that the piston rod passes on one side of it, and a mold table mounted in said frame and resting on the upper end of said piston rod.

5. A power molding machine, comprising a frame having a lower cross bar and an upper cross bar, a fluid-pressure cylinder removably mounted between said cross bars, a piston mounted within said cylinder, a piston rod extending from said piston above said upper cross bar, said cylinder and piston and piston rod being removable from the frame while the cross bars of the latter are in working position, and a mold table mounted in said frame and detachably resting on the upper end of said piston rod.

6. A power molding machine, comprising a frame, a mold table slidably mounted therein, and a fluid-pressure cylinder and piston mounted in said frame for operating said mold table, said mold table and cylinder interlocking so that the mold table when in place holds the cylinder in place and when removed permits the cylinder to be removed.

7. A molding machine, comprising a frame, a mold table carried thereby and reciprocable vertically, a bail for coöperation with said mold table, pivot arms carrying said bail, trunnions on the frame for pivotally supporting said pivot arms, and washers on such trunnions which can be placed on either side of said pivot arms as desired to change the distance between said pivot arms to receive different sized bails.

8. A power molding machine, comprising a frame, a mold table slidably mounted thereon, and a cylinder and piston removably mounted in said frame and operating on said mold table, said cylinder and said frame having coöperating positioning parts.

9. A power molding machine, comprising a frame, a mold table slidably mounted thereon, and a cylinder and piston removably mounted in said frame for operating said mold table, said cylinder and piston and said frame and table having interfitting parts for positioning the cylinder and piston.

10. A power molding machine, comprising a frame, a mold table slidably mounted thereon, and a plurality of cylinders and pistons any one of which may be removably mounted in said frame for operating said mold table.

In witness whereof, I have hereunto set my hand at Indianapolis, Indiana, this first day of September, A. D. one thousand nine hundred and fourteen.

ALLAN S. BIXBY.

Witnesses:
WILLIAM L. BEAUCHAMP,
MORRIS H. BANNISTER.

Copies of this patent may be obtained for five cents each, by addressing the "Commissioner of Patents, Washington, D. C."